April 10, 1956  R. R. DOUGLAS  2,741,122
GAS METERS
Filed Nov. 12, 1953  4 Sheets-Sheet 1

INVENTOR.
Robert R. Douglas
BY
Ralph Hammar
Attorney

April 10, 1956 R. R. DOUGLAS 2,741,122
GAS METERS
Filed Nov. 12, 1953 4 Sheets-Sheet 2

INVENTOR.
Robert R. Douglas
BY Ralph Harriman
attorney

April 10, 1956  R. R. DOUGLAS  2,741,122
GAS METERS
Filed Nov. 12, 1953  4 Sheets-Sheet 4

INVENTOR.
Robert R. Douglas
BY
Ralph Hammar
Attorney

United States Patent Office 2,741,122
Patented Apr. 10, 1956

2,741,122

GAS METERS

Robert R. Douglas, Erie, Pa., assignor to American Meter Company, Incorporated, Erie, Pa., a corporation of Delaware Application November 12, 1953, Serial No. 391,639

13 Claims. (Cl. 73—268)

This invention is intended to simplify the manufacture, assembly, and adjustment of gas meters. Features include a meter case adapted to casting or plastic molding in which a pair of measuring chambers are formed by inserting a diaphragm pan into an open ended bore in the casting and the gas distributing chamber with the inlet, outlet, and valve passages are integral with one wall of the bore. Another feature is the tangent adjustment with the angular adjustment center offset from the crankshaft so as to make a change in the tangent length with angular adjustment offsetting or compensating for changes in the proof of the meter at either the open (high) or check (low) rates. This simplifies the adjustment. For example, if the open rate is compensated, the adjustment of the meter can be made in two steps: (1) Adjusting the length of the tangent to bring the open rate of 100 proof and (2) Adjusting the angle of the tangent to bring the check rate of 100 proof.

Figure 2:
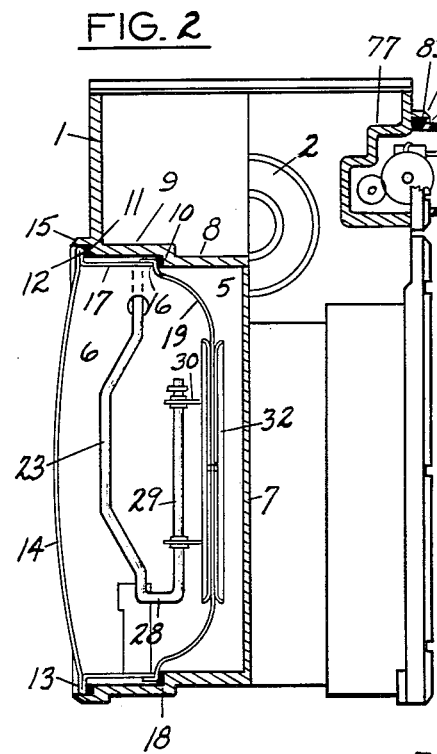
Figure 1:
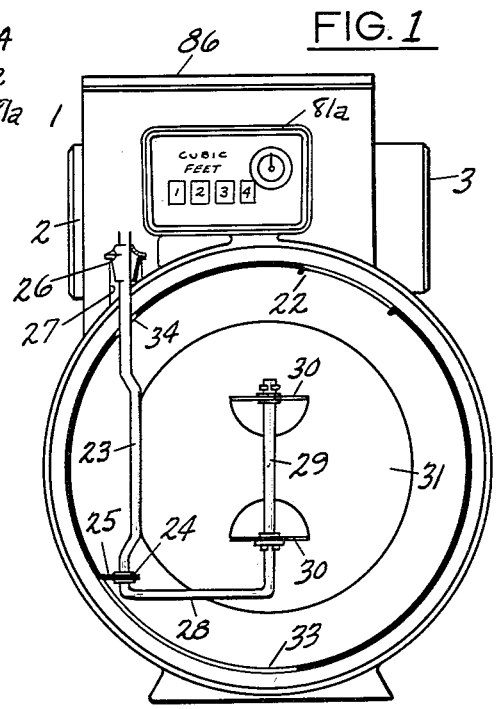
Figure 3:
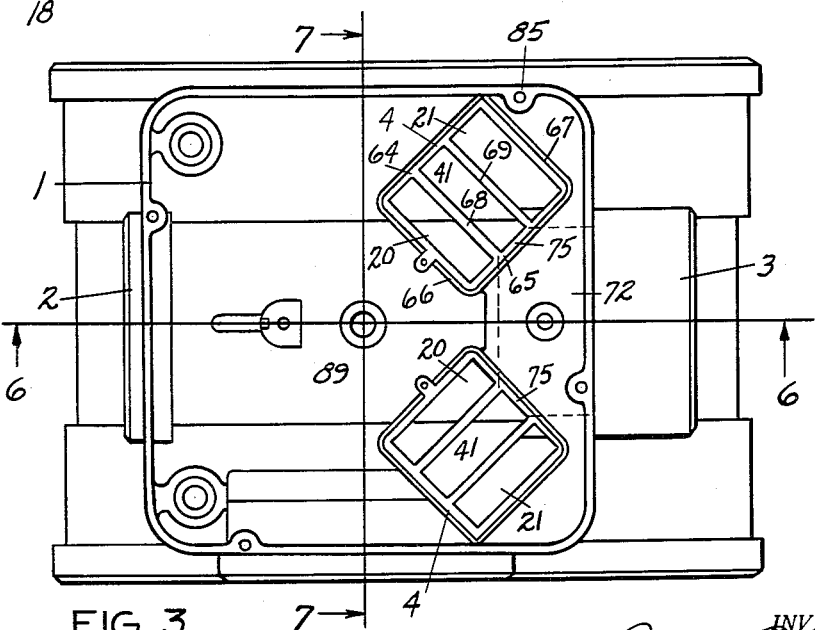
Figure 4:
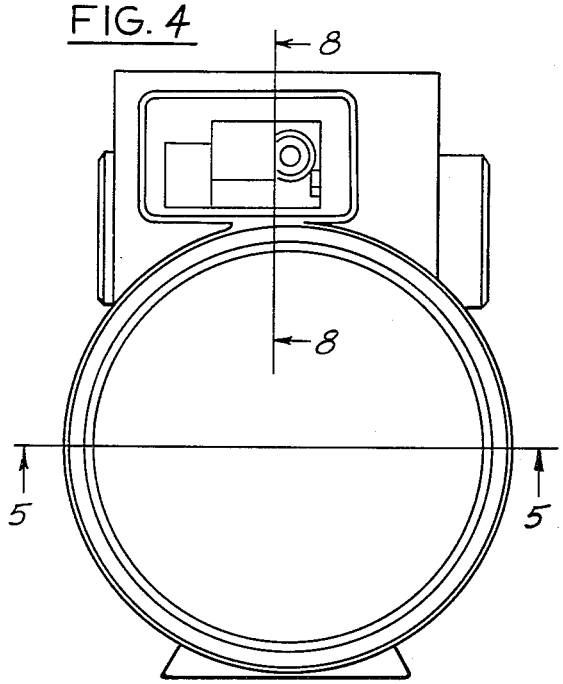
Figure 7:
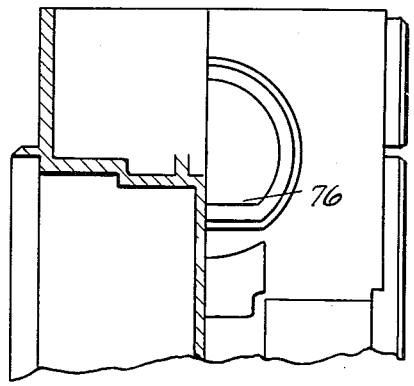
Figure 5:
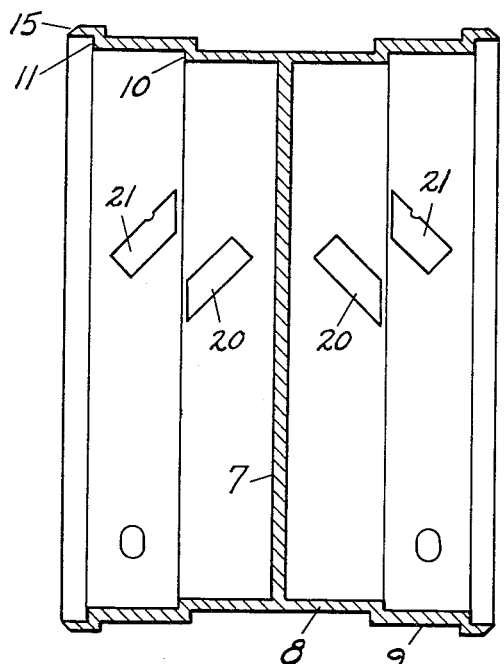
Figure 8:
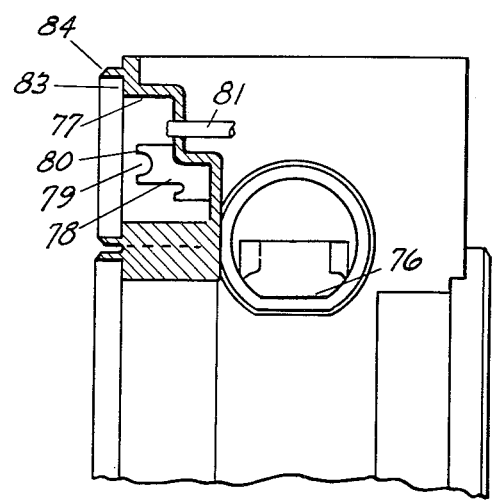
Figure 9:
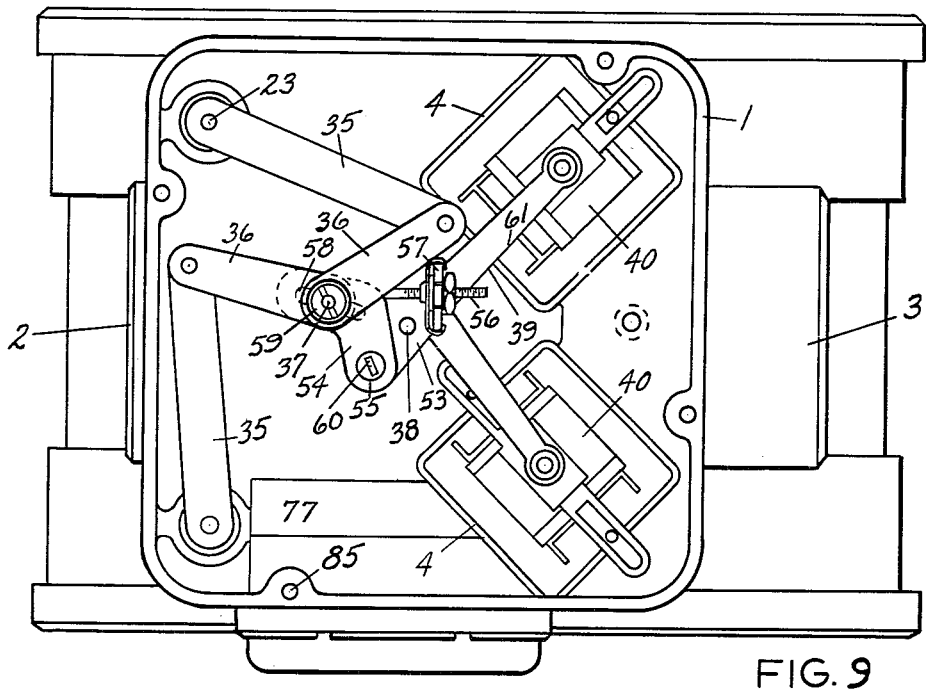
Figure 10:
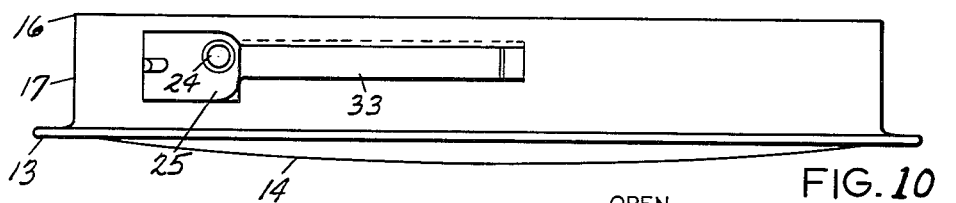
Figure 11:
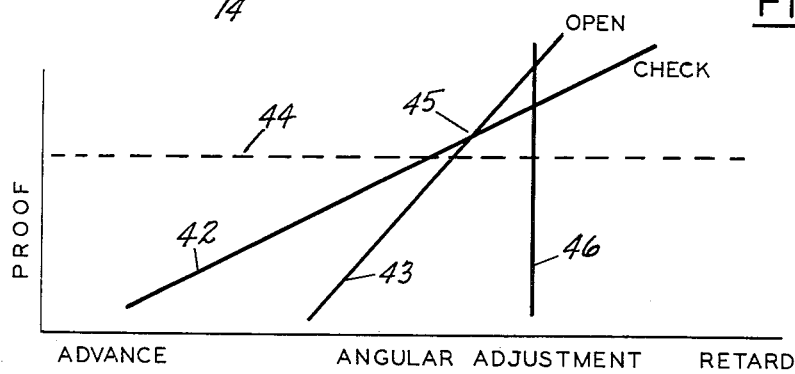
Figure 6:
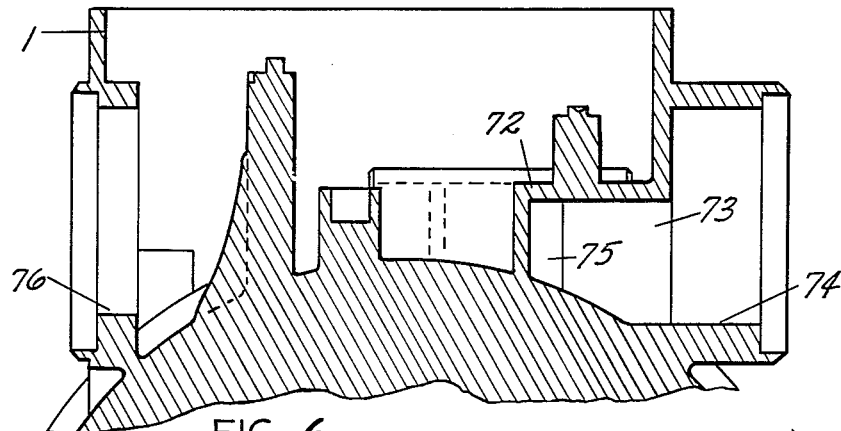
Figure 12:
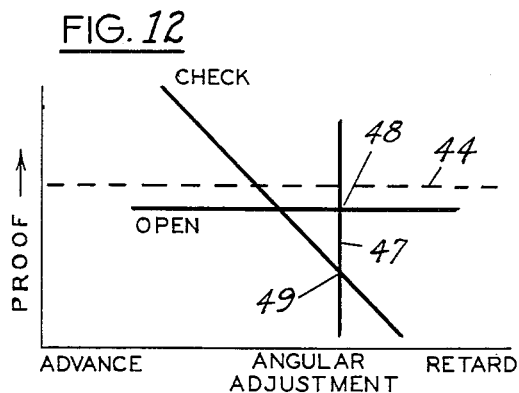
Figure 13:
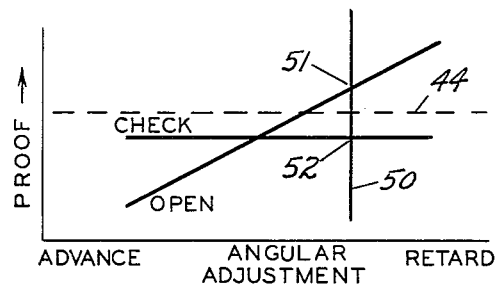
Figure 14:
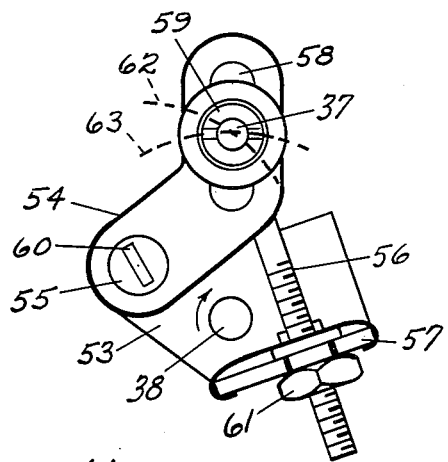
Figure 15:
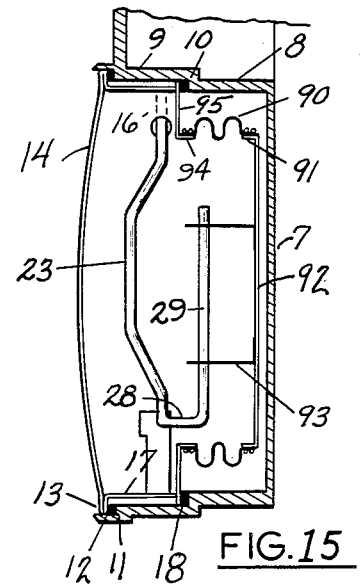

In the accompanying drawing, Fig. 1 is a front view of the meter partly in section; Fig. 2 is a side view partly in section; Fig. 3 is a top plan view of the meter casting; Fig. 4 is a front view of the meter casting; Fig. 5 is a section on line 5—5 of Fig. 4; Fig. 6 is a part section on line 6—6 of Fig. 3; Fig. 7 is a part section on line 7—7 of Fig. 3; Fig. 8 is a part section on line 8—8 of Fig. 4; Fig. 9 is a top plan view of the gas distributing chamber; Fig. 10 is an edge view of one of the diaphragm pans; Fig. 11 is a diagram of the operation of the conventional tangent; Fig. 12 is a diagram of operation of the present tangent when set for constant open rate; Fig. 13 is a diagram of operation of the present tangent when set for constant check rate; and Fig. 14 is a top plan of the tangent; and Fig. 15 is a view similar to Fig. 2 with a bellows shaped diaphragm.

The invention is shown applied to a gas meter having a gas distributing chamber 1 provided with inlet and outlet fittings 2 and 3 and two valve chambers 4 controlling the flow of gas into and out of two pairs of gas measuring chambers 5 and 6, one pair of measuring chambers being on one side of a partition 7 and the other pair being on the other side of the partition. As shown more clearly in Fig. 5, the side walls of the measuring chambers 5 and 6 are formed by cylindrical sections 8 and 9 extending from opposite sides of the partition 7. The sections 8, which are of smaller diameter, are adjacent the partition and the sections 9, which are of larger diameter, extend from the outer ends of the sections 8 there being shoulders 10 provided by the abrupt increase in diameter. At the outer ends of the sections 9 is an annular shoulder 11 carrying a gasket 12 against which is pressed the outwardly extending rim 13 of a diaphragm pan 14. In the assembly, the flange 13 is pressed against the gasket 12 to make the sealing engagement and then is staked in place by peening the portions of a flange 15 on the casting. At the same time that the flange 13 on the pan 14 makes sealing engagement with the shoulder 11, the inner end 16 of cylindrical side walls 17 on the pan 14 is pressed into sealing engagement with a gasket 18 on the shoulder 10. A diaphragm 19 having its outer periphery tied to the inner end 16 of the walls 17 is thereby sealed against the shoulder 10. The staking of the pan against the flange 11 accordingly serves the further function of sealing the periphery of the diaphragm 19 against the shoulder 10. This completes the outer walls of the measuring chambers 5 and 6, the measuring chamber 5 being between the partition 7 and the diaphragm 19 and the measuring chamber 6 being between the diaphragm 19 and the pan 14. It should be noted that the side walls 17 of the pan have a diameter greater than the bore of the cylindrical sections 8 and less than the bore of the cylindrical sections 9. The side walls 17 are accordingly spaced inward from the bore of the cylindrical sections 9 and gas can be fed into the interior of the measuring section 6 through any point in the side walls 17. In the present construction, there are openings in the bottom of the distributing chamber 1 feeding the measuring chambers 5 and 6. Openings 20 lead from the distributing chamber 1 to the measuring chambers 5. Openings 21 lead from the distributing chamber 1 to the measuring chambers 6. There need be no seal to the openings 20 and 21, since these openings are in the bottom wall of the measuring chamber which is common to the cylindrical side wall 8 and 9 of the measuring chambers. Since the openings 20 and 21 are located to one side of the sealing shoulders 10 and 11, the need for any tight connection to the openings is eliminated. The openings 20 feed directly to the measuring chambers 5. The openings 21 feed to the space between the pan walls 17 and the cylindrical sections 9 and through suitable openings such as indicated at 22 into the interior of the pan. There accordingly is essentially direct communication from the openings 21 to the measuring chambers 6.

In the operation of the meter, the diaphragm 19 reciprocates back and forth into the measuring chambers 5 and 6 alternately increasing and decreasing the volume of the measuring chambers and thereby measuring the flow of gas. The motion of the diaphragms 19 is transmitted to the indicating mechanism by flag rods 23, each journaled in an eyelet 24 in a tab 25 struck out of the wall 17 of the pan 14 and in a combined seal and guide bearing 26 in an opening 27 in the bottom wall of the measuring chamber. The flag rod has at its lower end a crank arm 28 having at its inner end a crank pin 29 journaled in spaced tabs 30 struck out of a disc 31 clamped to a disc 32 at the center of the diaphragm. At the lower part of the pan side walls 17 is a slot 33 through which the crank arm 28 can be inserted and at the upper part of the side walls 17 in line with the opening 27 is a clearance opening 34 through which the flag rod 23 extends. The openings 33 and 34 facilitate the assembly of the meter and since the pan 14 does not have to be gas tight except at the seal against the shoulders 10 and 11, the openings in no way affect the operation of the meter. Each of the flag rods 23 has its upper end extending within the measuring chamber 1 and has fixed thereto, for example, by soldering to the upper end a crank arm 35 connected by links 36 to the wrist pin 37 of a tangent fixed at 38 to a crankshaft having the usual crank connected by arms 39 to slide valves 40. As shown more clearly in Fig. 3, there is an outlet port 41 between each of the ports 20 and 21 and the slide valves 40 reciprocate between positions alternately connecting one of the ports 20 or 21 to the outlet port 41 and exposing the other of the ports 21 or 20 to the gas distributing chamber 1. This reciprocation of the slide valves 40 accordingly connects one of the gas measuring chambers 5 or 6 to the outlet port 41 and at the same time connects the other of the measuring chambers to the gas distributing chamber so that it can be filled with gas. The volume of gas successively taken in and discharged from each of the measuring chambers 5 and 6 depends upon the length of stroke of the flag rod 23 which is determined by the distance of the wrist pin 37 from the crankshaft 38 and also depends upon the timing of the valves 40. If the valves 40 are timed fast, less gas will be taken into the measuring chambers, while if the valves are timed slow, more gas will be taken in, because the added time for gas admission will tend to blow the diaphragms 19 to a larger volume. It is accordingly necessary that the tangent connecting the flag rods 23 to the crankshaft 38 be adjustable both as to length of stroke and as to angular relation with reference to the crank controlling the valves.

Unfortunately, the angular adjustment of the tangent with reference to the crankshaft 38 has heretofore had a different effect at the high and low rates of flow known in the art as the open rate and the check rate. In Fig. 11, line 42 shows the variation in proof or percentage registration with angular adjustment at the low or check rate of flow, line 43 shows the variation in proof with angular adjustment at the high or open rate of flow and dotted line 44 is the hundred-proof line which corresponds to correct registration of the meter. The curves shown in Fig. 11 are for typical prior art tangents. With these tangents, if the angular adjustment were at the point indicated by the reference numeral 45, the meter could be brought to one hundred proof at both the open and check rates by merely adjusting the length of the tangent. However, when the meter is assembled, the angular adjustment will invariably be at some other point, for example, that indicated by the line 46 in which case both the open and check rates would be at different proofs. If one of these is brought to one hundred proof by adjusting the length of the tangent, the other will be off proof and while the meter can be brought to one hundred proof at both the open and check rates, it will be necessary to successively adjust both the angle and length of the tangent until by trial and error the open and check rates are brought to one hundred proof. This invariably has involved multiple adjustments, the number depending to a considerable extent upon the skill of the operator.

Figs. 12 and 13 show the operation of tangents constructed in accordance with the present invention. In Fig. 12, the tangent is adjusted so that the open or high rate is independent of the angular adjustment. With this tangent, the meter can be brought to one hundred proof by merely adjusting the length of the tangent until the open rate is at one hundred proof and then adjusting the tangent angle until the check rate is at one hundred proof. In Fig. 13 where the check rate is independent of the angular adjustment, the same two steps are needed, namely, adjusting the length of the tangent until the check rate is at one hundred proof and then adjusting the angle of the tangent until the open rate is at one hundred proof. This eliminates the multiple adjustments needed in tangents having the operating characteristics shown in Fig. 11.

For example, referring to Fig. 12, if the meter as assembled has the adjustments indicated by line 47, with the open rate at point 48 and the check rate at point 49, the meter would be brought into correct registration by adjusting the open rate so as to bring point 48 up to one hundred proof and then by adjusting the tangent angle so as to bring the check rate up to one hundred proof. Similarly, if in Fig. 13, the meter as assembled has the adjustment indicated by the line 50 with the open rate at point 51 and the check rate at point 52, the meter can be brought into correct registration by adjusting the length of the tangent so as to bring point 52 up to one hundred proof and then by adjusting the angle of the tangent so as to bring point 51 down to one hundred proof. In both the Figs. 12 and 13 tangents, the adjustment is greatly simplified by the fact that the angular adjustment of the tangent does not affect the accuracy of the registration of the meter for one of the rates of flow for which the meter is adjusted.

The tangent for producing the characteristics illustrated in Figs. 12 and 13 is shown in Figs. 9 and 14. As there shown, the tangent comprises three parts: A bracket 53 fixed to the crankshaft 38, a lever 54 pivoted at 55 on the lever 53, and an adjusting screw 56 extending between a flange 57 on the bracket 53, and the wrist pin 37. The wrist pin 37 is received in a slot 58 in the lever 54 and can be locked in any selected position by tightening a nut 59. The pivoting of the lever 54 about 55 can also be locked by tightening the screw 60. With this construction, the adjustment of the length of the tangent, that is, the distance between the crankshaft 38 and the wrist pin 37 can be linearly adjusted along the slot 58 along the center line of the wrist pin and the crankshaft by means of the nut 61 on the adjusting screw 56. Before the wrist pin can be adjusted, the nut 59 must be loosened and when the tangent has been adjusted into the correct length, tightening the nut 59 locks the tangent in the adjusted position. The angular adjustment of the tangent is effected by loosening the screw 60 and then pivoting the lever 54 about the point 55 by turning the nut 61. This does not change the position of the wrist pin in the slot 58, but does swing the lever 54 about the point 55 as indicated by arc 62. This changes the effective length of the tangent in each angular position by the difference between the arc 62 centered on the point 55 and the arc 63 centered on the crankshaft 38. The pivot point 55 must be located lagging behind a center line connecting the crankshaft 38 and wrist pin 37 as regards the direction of rotation of the crankshaft (clockwise in Fig. 14) so that as the valve timing is advanced the tangent will be lengthened and as the valve timing is retarded the tangent length is shortened. The location of the pivot point 55 is not critical. By properly locating the pivot point 55, the change in effective length of the tangent can be made to exactly compensate for the change in registration at either the check or open rates of flow. This makes the registration for the selected rate of flow independent of angular adjustment. In effect, the angular adjustment introduces a compensation into the effective length of the tangent for one of the check or open rates of flow which prevents any change in percentage registration or proof at that rate of flow no matter how the angular adjustment is made. This, of course, cannot be effective for absurd angular adjustments, because the compensation depends upon the difference between two arcs 62 and 63. However, for the practical range of angular adjustment, plus or minus 15°, practical compensation can be obtained. To obtain this compensating effect, it is necessary that the angular adjustment of the tangent be about a point offset on the lagging side as regards the direction of rotation of a center line connecting the wrist pin 37 and the crankshaft 38. The offsetting of the pivot point 55 for the angular adjustment of the tangent from the crankshaft 38 introduces the possibility of having the effective length of the tangent compensate for the change in proof with angular adjustment at any selected rate. For example, referring to the conventional tangent having the performance characteristics illustrated in Fig. 11, as the angular adjustment is made in the direction to advance the valve timing, or to shut off the intake to the measuring chambers in advance of the flow stroke of the flag rod, the proof would normally fall off as indicated by lines 42 and 43. However, with the present tangent, as shown in Fig. 14, as the angular adjustment is made in the direction to advance the valve timing (counter-clockwise in Fig. 14) the wrist pin 37 moves along arc 62 and the distance from the crankshaft 38 to the arc 62 is increased by an amount to prevent the falling off in percentage registration or proof for either the open or check rates. Since the change in percentage registration is different for both the open and check rates of flow, it is not possible to make both of these independent of the angular adjustment. However, it is possible by proper selection of the amount of offsetting of the pivot point 55 to obtain practical compensation for one of the rates of flow so that at that rate of flow (either the check or open rate) angular adjustment of the tangent will not affect the proof. Because of the variations in different meters, the amount of offset of the angular adjustment pivot point 55 will also vary for different meter constructions. However, in all meters, the offsetting of the angular adjustment pivot point to one side of the crankshaft offers the possibility of compensating one of the rates of flow for the variations in proof with angular adjustment inherent in all tangents where the pivot point for angular adjustment is not offset to one side of the center line connecting the crankshaft and wrist pin.

The valve chamber for the ports 20 and 21 leading to the measuring chambers 5 and 6 and for the outlet port 41 comprises rectangular walls cast integral with the bottom wall of the distributing chamber and comprising side walls 64 and 65 and end walls 66 and 67. Spaced inward from the end wall 66 is a vertical cross-wall 68 which defines the inlet port leading to the measuring chamber 5. Spaced inward from the end wall 67 is a cross-wall 69 which defines the port 21 leading to the measuring chamber 6. A space between the cross-walls 68 and 69 defines the outlet port 41. The upper edges of the walls 64–69, inclusive, are preferably machined flat so as to co-operate with the slide valves 40. Integral with the side walls 65 on the valve chamber is an arch 72 joined at its lower edges to the bottom wall of the distributing chamber and defining an outlet 73 terminating at its outer end in the non-circular opening 74 in which is staked the outlet fitting 3. At the inner end, the outlet passageway 73 is cored through the side walls 65 at 75 to the valve outlet ports 41. Since the side walls 65 of the valve chambers diverge from opposite sides of the center of the outlet passageway 73, the cores for the openings 75 to the valve outlet ports 41 can conveniently be drawn out through the outlet passageway. This is particularly advantageous in diecasting or plastic molding. Directly opposite the outlet passageway 73 is a non-circular opening 76 in which is staked the inlet fitting 2. While the outlet fitting 3 has to be large enough to permit the easy retraction of the cores forming the openings 75, it is not necessary that the inlet fitting be the same size as the outlet fitting. However, in order that the fittings may be interchangeable, the opening 76 receiving the inlet fitting 2 is preferably made the same size as the opening 74 receiving the outlet fitting 3.

The meter register is housed in a recess 77 cast into one of the side walls of the gas distributing chamber. On the bottom of the recess are projections 78 having open ends 79 receiving the meter register assembly shaft. These open ends have projections 80 which can be staked over the shaft holding it in place. The projections 78 and the recess 77 comprise the meter register frame and eliminate the need for a separate frame for the meter register. A drive shaft 81 extends through the bottom wall of the recess 77 and is provided with the usual drive and seal (not shown). After the meter register has been staked in place on the projection 78, the front of the recess 77 is closed by a transparent plastic case 81a having a peripheral flange 82 seated in sealing engagement with a seat 83 and staked in place by peening in a flange 84 on the casting. As is evident, the meter is adapted to ease of assembly, manufacture, and adjustment. A single diecasting provides the outer walls for the measuring chambers 5 and 6 and the side and bottom walls of the gas distributing chamber 1. The only machining operation necessary on the casting is the machining of the seats for the valves 40 and the tapping of holes 85 for the cover 86 enclosing the top of the distributing chamber. The tapping can be eliminated if the cover is staked in place. No machining is necessary for the inlet and outlet fittings 2 and 3, because these are merely pressed into the non-circular openings 74 and 76 and then staked in place. No machining is necessary for the measuring chambers 5 and 6, because these chambers are sealed when the pans 14 with the diaphragms 19 and flag rods 23 assembled therein are pressed into sealing engagement with the seats 10 and 11 and staked in place. The crank arms 35 at the upper ends of the flag rods 26 are soldered in place making permanent connections. The tangent bracket 53 is soldered to the upper end of the crankshaft 38 which is mounted in a pre-cast boss 89 on the bottom wall of the gas distributing chamber. This establishes the proper relation between the crank arms 35 and the tangent. When the tangent bracket 53 is fixed to the crankshaft 38, the angular adjustment pivot 55 is located on the lagging side of the crankshaft as regards its direction of rotation in the proper position to compensate for changes in either the check or open rates with angular adjustment. This permits substantially independent adjustment of the open and check rates (1) by adjustment of the length of the tangent by moving the wrist pin 37 along the slot 58 and (2) by moving the pin angularly about the pivot point 55. The assembly of the meter register is likewise facilitated by the present design. The meter register shaft assembly is assembled and staked into open ended recesses 79 thereby utilizing the recess 77 which houses the register assembly as the supporting frame for the assembly. The outer enclosure of the meter register is completed by staking in place the transparent plastic cover.

Fig. 15 shows the use of a bellows diaphragm 90 having its inner end tied around a flange 91 on a disk 92 connected to the crank pin 29 by brackets 93 and having its outer end tied to a flange 94 on an annular plate 95 clamped against the gasket 18 on the shoulder 10 by the inner end 16 of the pan 14. The staking of the pan in place completes the sealing of the meter as in the previously described construction. The difference is primarily in the diaphragm construction.

The construction has been shown with four chamber meters but obviously can be used with three chamber meters where the center partition 7 is omitted and the third chamber is defined by the space between the diaphragms.

What is claimed as new is:

1. In a gas meter, a case having a bore with its outer end open and its other end provided with means for closing the same and a gas distributing chamber having a wall common with one side of the bore, a pan having a closed outer end and further having cylindrical side walls telescoped within the bore and a diaphragm at the inner end of the pan side walls forming two gas measuring chambers, one between one side of the diaphragm and the pan and the other on the opposite side of the diaphragm, a seal for the diaphragm comprising a shoulder in the bore cooperating with the inner end of the pan side walls to clamp the diaphragm, another seal between the pan and the case spaced from the diaphragm, and said case having gas passageways from the distributing chamber to opposite sides of the diaphragm through said common wall.

2. In a gas meter, a case having a bore having its outer end open and its other end provided with means for closing the same and a gas distributing chamber having a wall common with one side of the bore, said bore increasing in diameter toward its outer end and provided with an internal peripheral shoulder intermediate its ends, a pan having a closed outer end and further having cylindrical side walls of diameter greater than the minimum bore diameter and less than the maximum bore diameter telescoped within the bore, means including a diaphragm at the inner end of the pan side walls forming two gas measuring chambers, one between one side of the diaphragm and the pan and the other on the opposite side of the diaphragm, said diaphragm having a structure overlying and sealed against said shoulder by the inner ends of the pan side walls, means sealing the pan to the case at the outer end of the bore, and said case having gas passageways from the distributing chamber to opposite sides of the diaphragm through said common wall.

3. In a gas meter, a case having a bore with its outer end open and its other end provided with means for closing the same and a gas distributing chamber having a wall common with one side of the bore, a pan having cylindrical side walls telescoped within and spaced from the bore and a closed end wall at the outer end of the bore, the cylindrical walls of the pan having openings therein, a diaphragm extending across the two gas measuring chambers, one between one side of the diaphragm and the pan and the other on the opposite side of the diaphragm, means sealing the diaphragm to the intermediate part of the bore, means sealing the pan at the outer end of the bore, means sealing the cylindrical walls of the pan to the bore inward from the openings in the cylindrical walls of the pan, and said case having gas passageways from the distributing chamber through said common wall into the bore on opposite sides of the diaphragm.

4. In a gas meter, a case having a bore with its outer end open and its other end provided with means for closing the same, a pan having cylindrical side walls telescoped within and spaced from the bore and an end wall at the outer end of the bore, the cylindrical walls of the pan having openings therein, a diaphragm extending across the pan side walls at an intermediate part of the bore and forming two gas measuring chambers, one between one side of the diaphragm and the pan and the other on the opposite side of the diaphragm, means sealing the pan to the bore at the outer end of the bore, means sealing the cylindrical walls of the pan to an intermediate part of the bore inward from the openings in the cylindrical walls of the pan, and said case having two gas passageways to the bore, one between said sealing means and the other on the side of said second sealing means remote from the first sealing means.

5. In a gas meter, a case having a bore with its outer end open and its other end provided with means for closing the same and a gas distributing chamber having a wall common with one side of the bore, the outer part of said bore being of larger diameter than the inner part and said bore having an abrupt increase in diameter intermediate its ends providing an internal shoulder, a pan having cylindrical side walls telescoped within and spaced from the bore and an end wall at the outer end of the bore, a diaphragm clamped against said shoulder by the inner ends of the pan side walls and forming two gas measuring chambers, one between one side of the diaphragm and the pan and the other on the opposite side of the diaphragm, sealing means between the outer end of the pan and the case, and said case having gas passageways from the distributing chamber to opposite sides of the diaphragm through said common wall.

6. In a gas meter, a case forming a gas distributing chamber having a bottom wall with an integral section having sides raised above the bottom wall and defining a pair of spaced inlet ports leading through the wall to measuring chambers and an outlet port leading through one side of said raised section above the bottom wall intermediate the inlet ports, an integral outlet section on said bottom wall having its inner end joined to said one side of the raised section and communicating with the outlet port through said side of the raised section, a fitting in said integral outlet section for connection to a gas line, and a slide valve movable between alternative positions bridging the outlet port and one and then the other of the inlet ports.

7. In a gas meter, a casing having a pair of open ended cylindrical measuring chamber sections axially aligned and extending from opposite sides of a center partition, integral walls extending transverse to the cylindrical sections and defining side walls of a gas distributing chamber, the bottom wall of which is defined by the cylindrical sections, integral upstanding walls on the bottom wall of the distributing chamber defining a pair of valve port chambers on opposite sides of the center partition, said valve port chambers having adjacent upstanding walls diverging from the center partition and each valve port chamber having a pair of spaced inlet ports leading into the adjacent cylindrical section and an outlet port intermediate the inlet ports leading through one of said adjacent upstanding walls, an integral outlet section arched over the cylindrical sections and having its inner end joined to the adjacent upstanding walls around the outlet ports, a fitting in said outlet section for connection to a gas line, and slide valves on the respective valve port chambers each movable between alternative positions bridging its outlet port and one and then the other of its inlet ports.

8. In a gas meter, a case forming a gas distributing chamber having a bottom wall with an integral section having sides raised above the bottom wall and defining a pair of spaced inlet ports leading through the wall to measuring chambers and an outlet port intermediate the inlet ports leading through one of said sides of the raised section above the bottom wall, an integral outlet section arched over said bottom wall having its inner end joined to said one of said sides of the raised section and encompassing the outlet port, a fitting in said integral outlet section for connection to a gas line, and a slide valve movable between positions bridging the outlet port and one and then the other of the inlet ports.

9. In a gas meter, a case forming a gas distributing chamber having a bottom wall with an integral section having sides raised above the bottom wall and defining a pair of spaced inlet ports leading through the wall to measuring chambers and an outlet port intermediate the inlet ports leading through one of said sides of the raised section above the bottom wall, an integral outlet section arched over said bottom wall having its inner end joined to said one of said sides of the raised section and encompassing the outlet port, said outlet section with the bottom wall defining a passageway leading to the outside of the gas distributing chamber and having a wall defining a non-circular outer end for the outlet section, a pipe fitting having a non-circular outer surface anchored in the outer end of the outlet section, and a slide valve movable between positions bridging the outlet port and one and then the other of the inlet ports.

10. In a gas meter, a case having a bore with its outer end open and its inner end terminating in an end partition, a pan having cylindrical side walls telescoped within and spaced from the bore and a closed end wall at the outer end of the bore, the cylindrical walls of the pan having openings therein, a diaphragm extending across the pan side walls at an intermediate part of the bore and forming two gas measuring chambers, one between the diaphragm and the partition and the other between the diaphragm and the end wall of the pan, means sealing the pan to the bore at the outer end of the bore, means sealing the cylindrical walls of the pan to an intermediate part of the bore inward from the openings in the cylindrical walls of the pan, said case having two gas passageways to the bore, one between said sealing means and the other on the side of said second sealing means remote from the first sealing means, a flag rod extending across and out through one side of the cylindrical side walls of the pan, said flag rod having a crank within the side walls of the pan, means connecting the crank to the diaphragm, and said pan side walls having openings therein through which the flag rod can be inserted.

11. In a gas meter, a case having a bore having its outer end open and its inner end terminating in an end partition and a gas distributing chamber having a wall common with one side of the bore, said bore increasing in diameter toward its outer end and provided with an internal peripheral shoulder intermediate its ends, a pan having a closed outer end and further having cylindrical side walls of diameter greater than the minimum bore diameter and less than the maximum bore diameter telescoped within the bore, a diaphragm at the inner end of the pan side walls forming two gas measuring chambers, one between the diaphragm and the partition and the other between the diaphragm and the pan, said diaphragm overlying and sealed against said shoulder, means sealing the pan to the case at the outer end of the bore, said case having two gas passageways to the bore, one on one side of the diaphragm and the other on the other side of the diaphragm, the cylindrical walls of the pan having openings therein, a flag rod extending across and out through one side of the cylindrical side walls of the pan into the gas distributing chamber, said flag rod having a crank within the side walls of the pan, means connecting the crank to the diaphragm, and said pan side walls and said common wall having openings through which the flag rod can be inserted.

12. In a gas meter, a casing forming a gas distributing chamber having a side wall and a meter register recess integral with said side wall, said recess having a bottom wall, bosses integral with the bottom wall of the recess, said bosses having open-ended recesses for receiving the meter register shaft whereby the bottom wall of the recess serves as the frame for the meter register, and a cover for the recess providing a window through which the register can be read.

13. In a gas meter, a case having a bore having its outer end open and its other end provided with means for closing the same and a gas distributing chamber having a wall common with one side of the bore, said bore increasing in diameter toward its outer end and provided with an internal peripheral shoulder intermediate its ends, a pan having a closed outer end and further having cylindrical side walls of diameter greater than the minimum bore diameter and less than the maximum bore diameter telescoped within the bore, a seal between the pan and the outer end of the case, an annular ring clamped between the cylindrical side walls of the pan and said shoulder, a bellows shaped diaphragm having one end fixed to the center of said ring, a disk fixed to the other end of the bellows and forming two gas measuring chambers, one between one side of the diaphragm and the pan and the other on the opposite side of the diaphragm, and said case having gas passageways from the distributing chamber to opposite sides of the diaphragm through said common wall.

References Cited in the file of this patent

UNITED STATES PATENTS

| | | |
|---|---|---|
| 1,892,827 | Brower et al. | Jan. 3, 1933 |
| 2,296,477 | McIntire | Sept. 22, 1942 |
| 2,346,229 | Ormerod et al. | Apr. 11, 1944 |
| 2,519,806 | Wilson et al. | Aug. 22, 1950 |
| 2,544,665 | Gilmore | Mar. 13, 1951 |
| 2,662,403 | Simpson | Dec. 15, 1953 |
| 2,663,189 | Butterworth et al. | Dec. 22, 1953 |

FOREIGN PATENTS

| | | |
|---|---|---|
| 438,473 | Great Britain | Nov. 18, 1935 |
| 650,650 | Great Britain | Feb. 28, 1951 |